United States Patent
Shiraki et al.

(10) Patent No.: US 10,784,049 B2
(45) Date of Patent: Sep. 22, 2020

(54) WINDING-TYPE STACKED BODY FOR CONDENSER WITH HIGH ELECTROSTATIC CAPACITANCE AND STACKED WINDING-TYPE CONDENSER USING THE SAME

(71) Applicant: LG CHEM, LTD., Seoul (KR)

(72) Inventors: Shinji Shiraki, Tokyo (JP); Sang-Hyun Park, Tokyo (JP)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/116,166

(22) PCT Filed: Feb. 3, 2015

(86) PCT No.: PCT/KR2015/001120
§ 371 (c)(1),
(2) Date: Aug. 2, 2016

(87) PCT Pub. No.: WO2015/115878
PCT Pub. Date: Aug. 6, 2015

(65) Prior Publication Data
US 2017/0178816 A1 Jun. 22, 2017

(30) Foreign Application Priority Data

Feb. 3, 2014 (JP) .................. 2014-018708
Feb. 3, 2015 (JP) .................. 2015-019006

(51) Int. Cl.
*H01G 4/30* (2006.01)
*H01G 4/015* (2006.01)
(Continued)

(52) U.S. Cl.
CPC ............. *H01G 4/306* (2013.01); *H01G 4/008* (2013.01); *H01G 4/015* (2013.01); *H01G 4/018* (2013.01);
(Continued)

(58) Field of Classification Search
CPC ........ H01G 4/306; H01G 4/008; H01G 4/015; H01G 4/30
(Continued)

(56) References Cited

U.S. PATENT DOCUMENTS 5,844,770 A  12/1998  Fries-Carr et al.
6,721,164 B1  4/2004  Albertsen et al.
(Continued)

FOREIGN PATENT DOCUMENTS

EP    0710395 A1   5/1996
JP    61-29526 A   2/1986
(Continued)

OTHER PUBLICATIONS

"Advances in film condenser from vehicle to energy", Nikkei Electronics, Sep. 17, 2012.
(Continued)

*Primary Examiner* — Michael P McFadden
(74) *Attorney, Agent, or Firm* — Dentons US LLP

(57) ABSTRACT

The purpose of the present invention is to provide a winding-type stacked body for a condenser capable of realizing a high electrostatic capacitance and a high degree of withstand voltage. The purpose is accomplished by a winding-type stacked body for a condenser, comprising a metal layer and a dielectric layer, wherein the dielectric layer exists on the metal layer, two metal layers having the dielectric layers constitute a pair and are stacked and wound to configure the winding-type stacked body, which comprises no plastic film.

10 Claims, 3 Drawing Sheets

(51) Int. Cl.
*H01G 4/32* (2006.01)
*H01G 4/018* (2006.01)
*H01G 4/008* (2006.01)

(52) U.S. Cl.
CPC ................. *H01G 4/30* (2013.01); *H01G 4/32* (2013.01); *Y02T 10/7022* (2013.01)

(58) Field of Classification Search
USPC ...................................................... 361/301.5
See application file for complete search history.

(56) References Cited

U.S. PATENT DOCUMENTS

| | | | |
|---|---|---|---|
| 6,954,349 B2* | 10/2005 | Shiota | H01G 4/012 361/301.5 |
| 2006/0115672 A1 | 6/2006 | De Gryse et al. | |
| 2008/0094775 A1* | 4/2008 | Sneh | H01G 4/32 361/275.3 |
| 2008/0310075 A1* | 12/2008 | Takeoka | H01G 4/32 361/301.5 |
| 2009/0057860 A1* | 3/2009 | Bae | H01L 23/13 257/680 |
| 2011/0317329 A1* | 12/2011 | Letz | C03B 17/06 361/321.5 |
| 2012/0008254 A1* | 1/2012 | Min | H01G 11/06 361/505 |

FOREIGN PATENT DOCUMENTS

| | | |
|---|---|---|
| JP | 61-29528 A | 2/1986 |
| JP | 61-29529 A | 2/1986 |
| JP | 62-62447 A | 3/1987 |
| JP | 01-198011 A | 8/1989 |
| JP | 02-121315 A | 5/1990 |
| JP | 05-217800 A | 8/1993 |
| JP | 2821768 B2 | 11/1998 |
| JP | 11-008155 A | 1/1999 |
| JP | 11-214248 A | 8/1999 |
| JP | 2005-079230 A | 3/2005 |
| JP | 2006-521224 A | 9/2006 |
| JP | 2008-034706 A | 2/2008 |
| JP | 2010-165775 A | 7/2010 |
| KR | 10-0354991 B1 | 10/2002 |
| KR | 10-0392218 B1 | 7/2003 |
| KR | 10-2009-0107642 A | 10/2009 |
| KR | 10-1018240 B1 | 3/2011 |
| WO | 2004/075219 A1 | 9/2004 |

OTHER PUBLICATIONS

"Condenser of large capacity is made with 3 μm or less film", Automotive Technology, Jul. 2011, pp. 102-105.
"Small Film Capacitor for Hybrid Electric Vehicles (HEV) with High Withstand Voltage", Panasonic Technical Journal, vol. 57, No. 3, Oct. 2011, pp. 51-55.

* cited by examiner

Related Art

WINDING-TYPE STACKED BODY FOR CONDENSER WITH HIGH ELECTROSTATIC CAPACITANCE AND STACKED WINDING-TYPE CONDENSER USING THE SAME

This application is a National Stage Application of International Application No. PCT/KR2015/001120 filed on Feb. 3, 2015, which claims the benefit of Japanese Patent Application No. 2014-018708 filed on Feb. 3, 2014 and Japanese Patent Application No. 2015-019006 filed on Feb. 3, 2015, all of which are hereby incorporated by reference in their entirety for all purposes as if fully set forth herein.

TECHNICAL FIELD

The present application claims the benefit of Japanese Patent Application Nos. 2014-18708 filed on Feb. 3, 2014 and 2015-19006 filed on Feb. 3, 2015, the disclosure of which is incorporated herein by reference in its entirety. The present disclosure relates to a winding-type stacked body for a condenser with high electrostatic capacitance and a stacked winding-type condenser using the same.

BACKGROUND ART

A condenser includes a dielectric interposed between electrodes, and has properties that accumulate electric charges. Condensers have a wide range of application including equipment, power source, electric and electronic components, and automobile components.

Generally a condenser has a structure in which a dielectric (insulator) is interposed between two electrodes as shown in FIG. 1. Also, the electrostatic capacitance C[F] of the condenser is expressed as the following equation 1, in which the electrode area is A[m²], the permittivity of the dielectric is ε[F/m], and the distance between the electrodes is 1[M].

$$C = \varepsilon \frac{A}{l} = \varepsilon_0 \varepsilon_r \frac{A}{l} * 8.85 \times 10^{-12} \times \varepsilon_r \frac{A}{l} \ [F] \qquad \text{Equation 1}$$

(In the above equation 1, $\varepsilon_r$ is a specific permittivity)

Thus, to obtain a high electrostatic capacitance of the condenser, (1) increasing the electrode area A in contact with the dielectric, (2) using a dielectric having a high permittivity, and/or (3) reducing the distance between the electrodes (=reducing the thickness of the dielectric) is effective.

Recently, with the development and widespread of hybrid electric vehicles (HEVs) and electric vehicles (EVs), there is a demand for a condenser with smoothing high capacity and high voltage withstand to remove overlapping ripple factors (voltage, current) of the direct current from a motor and an inverter circuit. As their typical example, a film condenser is proposed in which a flexible resin film is used as a dielectric, a metal film is arranged along each main surface of the resin film such that the metal films face each other with the resin film interposed therebetween, the metal films forming first and second facing electrodes (Non-Patent Literature 1).

I. The film condenser generally has a cylindrical shape formed by winding the above described dielectric resin film or a pillar shape with flat end surfaces formed under pressure, and first and second outer terminal electrodes are respectively formed on the first and second facing end surfaces of the cylinder. Also, the above described first facing electrode is electrically connected to the first outer terminal electrode, and the second facing electrode is electrically connected to the second outer terminal electrode.

For example, Non-Patent Literature 2 proposes a condenser in which two metals are vacuum-deposited in vacuum on one surface of a polypropylene film to form an electrode, and two such films are prepared and stacked in overlapping manner such that the polypropylene film as a dielectric is interposed between the two electrodes (FIG. 2). Also, Non-Patent Literature 3 proposes a condenser in which a metal electrode is formed on a polymer film as a dielectric by vacuum deposition, a pair of two such films are overlapped in layers and wound (FIG. 2), and metal spraying (Metalicon) is performed on the end surfaces to form outer electrodes.

As disclosed in Non-Patent Literatures 2 and 3, for uses in HEVs and EVs, high voltage withstand and low loss (tan σ=dielectric loss tangent) is required for the film condenser. This is because if the dielectric loss tangent (tan σ) is high, problems occur such as an energy loss or heat generation involved therein, causing a unstable operation problem of a high frequency circuit. Under this background, in film condensers for high frequency uses, a polypropylene film (PP) having an extremely low dielectric loss tangent (tan σ) of 0.05% or less at 1 kHz is being mainly used as a dielectric film material. Also, it is general to use aluminum, aluminum alloys, zinc, zinc alloys, copper, and copper alloys as a metal electrode material due to having electrical properties and corrosion resistance and consideration related to costs.

However, the polypropylene film (PP) has a very low permittivity (ε) of about 2.2 (1 kHz, 20° C.), and obtaining sufficient electrostatic capacitance from this film condenser is very difficult. In addition, for film condensers, the permittivity and the dielectric loss tangent is significantly determined by the dielectric film, so controlling the capacitance and voltage withstand in the design is difficult. Furthermore, to obtain high capacitance, it is necessary to stretch the polypropylene film (PP) into a thin film, but an ultra thin film of 2 μm or less is susceptible to blocking and breakdown by introversion, unsuitable for high speed winding, and difficult to handle in the manufacturing process, such as, for example, occurrence of offset at end surfaces and wrinkles during winding.

II. Also, a stacked ceramic condenser has been developed in which a dielectric layer of a high permittivity and an inner electrode are stacked in multiple layers in alternating manner.

For example, Patent Literature 1 proposes a stacked ceramic condenser of low cost, high capacity unit area and small size, in which a high permittivity magnetic layer (high permittivity ceramic layer) having a specific permittivity higher than or equal to 10,000 is formed and used as a dielectric layer of a particular composition having a relatively low sintering temperature.

However, this stacked ceramic condenser has a problem of a change in capacity depending on materials used for the dielectric layer, for example, as the temperature changes, a change in electrostatic capacitance is larger, or when an electric current flows, the electrostatic capacitance is lower, and thus, the stacked ceramic condenser was unsuitable for uses requiring precise capacity. Furthermore, because it is stacked, but not wound in the form of a film condenser, the inner electrode area for each facing pair is small, and accordingly, the total electrostatic capacitance of the condenser was not necessarily higher than the film condenser.

On the other hand, Patent Literatures 2 to 5 propose a winding-type ceramic condenser manufactured by printing an electrode on an unsintered ceramic sheet made of a ceramic dielectric, and by winding a pair of two.

However, this winding-type ceramic condenser uses a ceramic sheet for a dielectric layer, the ceramic sheet formed by wet-coating a ceramic dielectric on a release film and peeling it off from the film after drying, and it was necessary to sinter the dielectric at the high temperature of one thousand and several hundreds ° C. in a post-process. In addition, the film thickness of the ceramic sheet is about 10 μm, and it is difficult to reduce the distance between electrodes to 3 μm or less, making it impossible to obtain condensers of high capacity and small size in demand in recent days. Further, because a dielectric loss tangent (tan σ) is a few %, high voltage withstand and low loss characteristics required for HEVs or EVs cannot be obtained.

Patent Literature 1: Japanese Patent No. 2821768
Patent Literature 2: Japanese Patent Publication No. S61-29526
Patent Literature 3: Japanese Patent Publication No. S61-29528
Patent Literature 4: Japanese Patent Publication No. S61-29529
Patent Literature 5: Japanese Patent Publication No. S62-62447
Non-Patent Literature 1: Nikkei Electronics, Sep. 17, 2012, "film-condenser makes an advance, vehicle energy crisis freely maintenance"
Non-Patent Literature 2: Automotive Technology, Jul. 2011, 102-105, "makes high capacity condensers using a film of 3 μm or less"
Non-Patent Literature 3: Panasonic Technical Journal, Vol. 57, No. 3, Oct. 2011, 51-55, "small-sized-high voltage withstand film condensers for HEVs"

DISCLOSURE

Technical Problem

From the above, there is an urgent need for development of a stacked body for a condenser and a condenser that can be still replaced with film condensers and stacked ceramic condensers, has high electrostatic capacitance and high voltage withstand, can achieve miniaturization and is easy to manufacture.

Technical Solution

At the time when the present invention was made, the inventors obtained knowledge that a winding-type stacked body for a condenser with high electrostatic capacitance and high voltage withstand, of small size, and easy to manufacture (easy to handle) and a condenser using the same can be obtained when the winding-type stacked body for a condenser includes a metal layer and a dielectric layer formed thereon and does not have a plastic film. The present disclosure was devised based on this knowledge.

The winding-type stacked body for a condenser proposed by the present disclosure is characterized in that it includes a metal layer and a dielectric layer, the dielectric layer is present on the metal layer (primarily representing an electrode) and a pair of two metal layers each having the dielectric layer are stacked and wound, and a plastic film is absent.

The winding-type stacked body for a condenser shown in FIG. 3 has a first metal layer A1 and a second metal layer A2, and a first dielectric layer B1 and a second dielectric layer B2 facing each other, wound around a winding axis, as well as a first outer terminal electrode 3 and a second outer terminal electrode 4 electrically connected to the first metal layer A1 and the second metal layer A2, respectively.

The first outer terminal electrode 3 and the second outer terminal electrode 4 are formed by spraying, for example, metal such as zinc, on each cross section of the winding-type stacked body for a condenser with a cylindrical shape obtained as described in the foregoing or a pillar shape with flat end surfaces obtained by applying the pressure. In this instance, the first outer terminal electrode 3 comes into contact with an exposed end of the first metal layer A1, and is thus electrically connected to the first metal layer A1. On the other hand, the second outer terminal electrode 4 comes into contact with an exposed end of the second metal layer A2, and is thus electrically connected to the second metal layer A2. Accordingly, one example of the present disclosure, the stacked winding-type condenser, can be proposed.

Advantageous Effects

According to the winding-type stacked body for a condenser in accordance with the present disclosure, the electrostatic capacitance per unit area is theoretically higher 100 times, achieving high electrostatic capacitance. In addition, because dielectric ceramic can be used for the dielectric layer, in the respect that there is freedom to select and combine the materials for the metal layer and the dielectric layer, desired permittivity and dielectric loss tangent can be set. Further, there is no need to handle the dielectric layer of an ultra thin plastic film, making it very easy to handle and manufacture.

Figure 1:
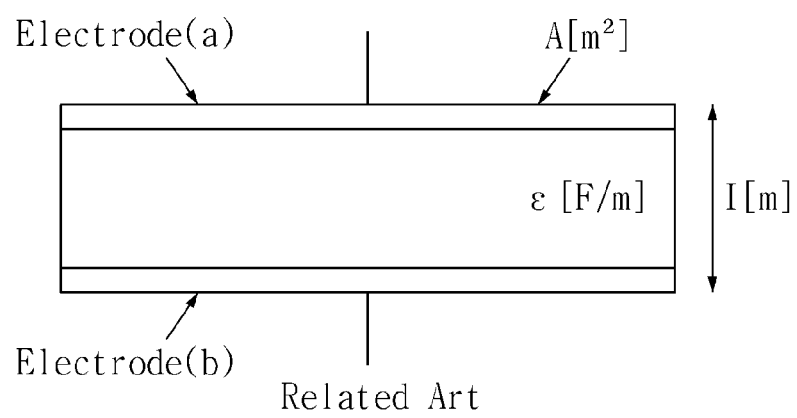
FIG. 1 is a basic schematic diagram of a condenser.
Figure 2:
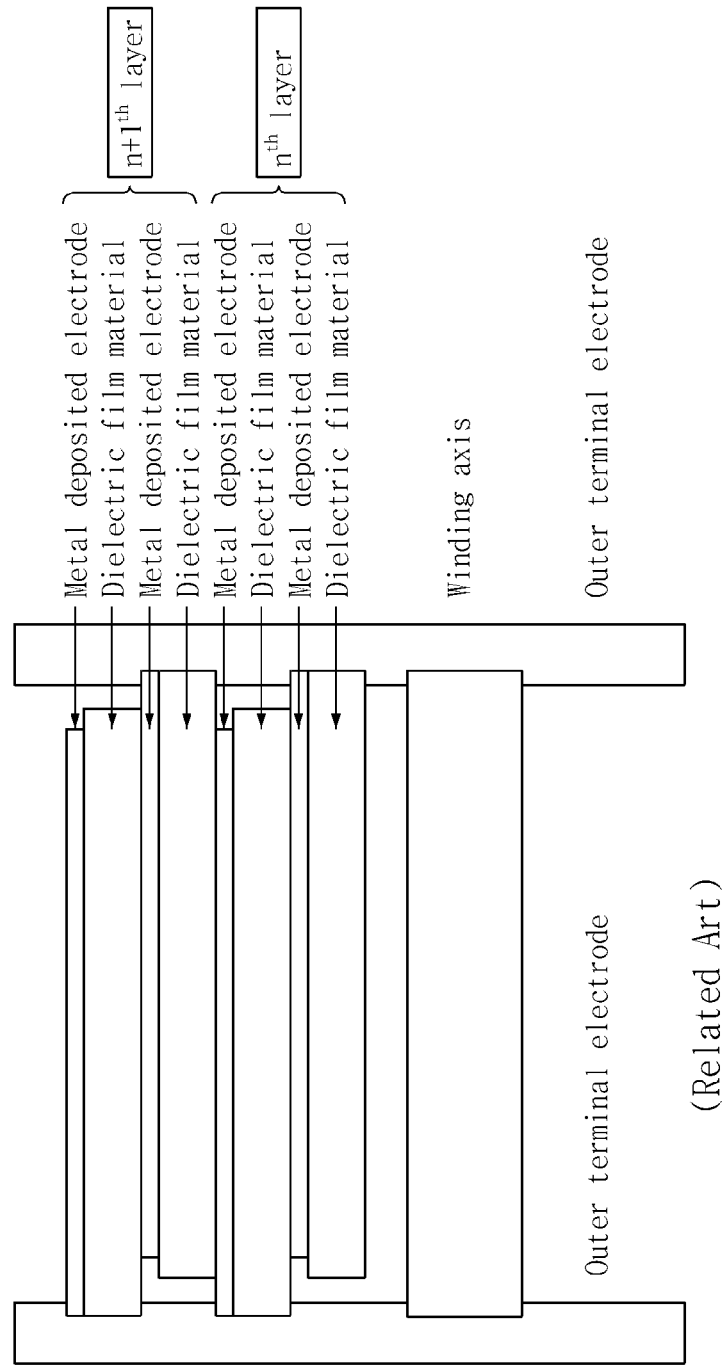
FIG. 2 is an outline diagram of a film condenser according to a related art.

BEST MODE (Stacked Winding-Type Condenser)
A winding-type stacked body for a condenser according to the present disclosure is characterized in that it includes a metal layer and a dielectric layer (condenser device) as a basic unit, which is stacked and wound multiple times to reach a desired electrostatic capacitance, and it does not include a plastic film (Preferably, a plastic film is not included in a completed winding-type stacked body for a condenser).

(Plastic Film)
The present disclosure is characterized in that a plastic film is absent.

The plastic film generally refers to one formed of a polymer substance such as synthetic resin in the shape a thin film. The shape of the plastic film includes a membrane, a foil, and a sheet, as well as a film.

The synthetic resin forming the plastic film includes thermoplastic resins, for example, polyethylene (PE), polyester (PL) such as polyethyleneterephthalate (PET), polypropylene (PP), polyvinylchloride (PVC), polyvinylidene chloride (PVDC), polystyrene (PS), polyvinyl acetate (PVAC), polyurethane (PUR), polytetrafluoroethylene (PTFE), acrylonitrile butadiene styrene resin (ABS resin), styrene acrylonitrile copolymer resin (AS resin), and acrylic resin (PMMA). In addition, thermosetting resins are available, for example, phenol resin (PF), epoxy resin (EP), melamine resin (MF), urea resin (UF), unsaturated polyester resin (UP), alchide resin, polyurethane (PUR), and thermosetting polyimide (PI).

The present disclosure excludes, particularly, a dielectric plastic film among the above.

(Dielectric Layer)
The dielectric layer acts as a dielectric, and may be formed of a single layer or multiple layers. Materials for the dielectric layer include one of metal oxide such as including molybdenum oxide, zinc oxide, magnesium silicate, titanium oxide, zirconium oxide, tantalum oxide, magnesium oxide and silicon oxide, metal hydroxide such as including aluminum hydroxide and magnesium hydroxide, metal nitride such as including boron nitride, aluminum nitride, gallium nitride, indium nitride, silicon nitride, copper nitride and zirconium nitride, talc, mica, calcium silicate, potassium silicate, calcined clay, barium sulfate, strontium titanate, calcium titanate, barium titanate, aluminum oxide, magnesium carbonate, calcium carbonate and barium carbonate, or mixtures thereof, and besides, compound such as oxide or nitride consisting of at least one of molybdenum, zinc, calcium, phosphorus, aluminum, potassium, silicon and magnesium, and the compound can be used in combinations.

Among them, especially, composite dielectric made by mixing titanium oxide, strontium titanate, barium titanate or titanium oxide and barium oxide as a main material with a few metal oxides; at least one of aluminum oxide, silicon oxide, aluminum nitride, silicon carbonate, barium titanate, forsterite, barium magnesium niobate and barium neodymium titanate, and particularly preferably, titanium oxide, strontium titanate, barium titanate, aluminum oxide and silicon oxide are available.

The layer thickness of the dielectric layer is higher than or equal to 5 nm and lower than 3 $\mu$m, and preferably a lower limit value is higher than or equal to 10 nm and an upper limit value is lower than or equal to 1 $\mu$m, and more preferably the lower limit value is higher than or equal to 20 nm and the upper limit value is lower than or equal to 500 nm.

When the layer thickness of the dielectric layer is higher than or equal to 5 nm, a short circuit between electrodes is impeded and sufficient insulation can be obtained. When the layer thickness of the dielectric layer is lower than 3 $\mu$m, high electrostatic capacitance is easy to obtain. Further, when winding is performed after forming the dielectric layer on the metal layer, it is easy to prevent any crack in the dielectric layer.

Preferably, the present disclosure uses a vapor deposition method as a method of forming the dielectric layer on the metal layer to obtain a uniform, dense, and ultra thin dielectric layer. The vapor method may be any one of a physical vapor deposition (PVD) method and a chemical vapor deposition (CVD) method.

Specific methods of PVD include a vacuum deposition method, an electron beam (EB) deposition method, a molecular beam epitaxy (MBE) method, an ion plating method, an ionized cluster beam (ICB) method, a sputtering method, ion beam deposition and pulse laser deposition, and among them, at least one of an electron beam (EB) deposition method, an ion plating method and a sputtering method may be used as a preferable method.

Also, specific methods of CVD include thermal CVD (APCVD and LPCVD), plasma CVD, optical CVD, a sol-gel method and an atomic layer deposition (ALD) method, and among them, thermal CVD, plasma CVD and an atomic layer deposition (ALD) method can be used as a preferable method.

Further, in addition to PVD and CVD, an aerosol deposition (AD) method can be used as a preferable method for forming the dielectric layer.

(Metal Layer)

The metal layer of the present disclosure acts as an (inner) electrode, and may be formed of a single layer or multiple layers.

Materials for the metal layer are not limited to a particular type of material, and for example, a metal foil, a metal membrane, and a metal film can be used, and a metal film may be formed on a release film. Metals used for the metal layer include, without any limitation, elements such as including aluminum, zinc, lead, gold, silver, platinum, chrome, copper, nickel and molybdenum, and mixtures and alloys thereof, and when taking environment, economic efficiency or condenser performance into account, aluminum, aluminum alloys, zinc, zinc alloy, copper, copper alloys is preferable.

The layer thickness of the metal layer is higher than or equal to 0.5 $\mu$m and lower than or equal to 20 $\mu$m, and preferably a lower limit value is higher than or equal to 1 $\mu$m and an upper limit value is lower than or equal to 13 $\mu$m, and more preferably the lower limit value is higher than or equal to 1.5 $\mu$m and the upper limit value is lower than or equal to 8 $\mu$m.

When the layer thickness of the metal layer is higher than or equal to 0.5 $\mu$m, if the dielectric layer is formed on the metal layer by roll-to-roll, breakdown in the metal layer is prevented and high speed winding is easy. When the layer thickness of the metal layer is lower than or equal to 20 $\mu$m, size- and weight-reduction of the condenser can be easily achieved, and high electrostatic capacitance can be obtained.

The metal layer can be a foil, a membrane, or a film. Also, a metal film may be formed on a release film, and a film forming method may be any of the above described physical vapor deposition (PVD), chemical vapor deposition (CVD) and aerosol deposition (AD) methods.

The release film includes a polymer film having good heat resistance, for example, a polypropylene film (PP) and a polyethylene terephthalate film (PET), and to enhance the release performance, a film having a coating of silicon on the film is used.

Also, if needs arise, the metal layer is preferably divided by patterning for the purpose of insulation recovery by removing a separated electrode at a location blown by the fuse function when a dielectric breakdown occurred.

(Stacking)

Figure 3:
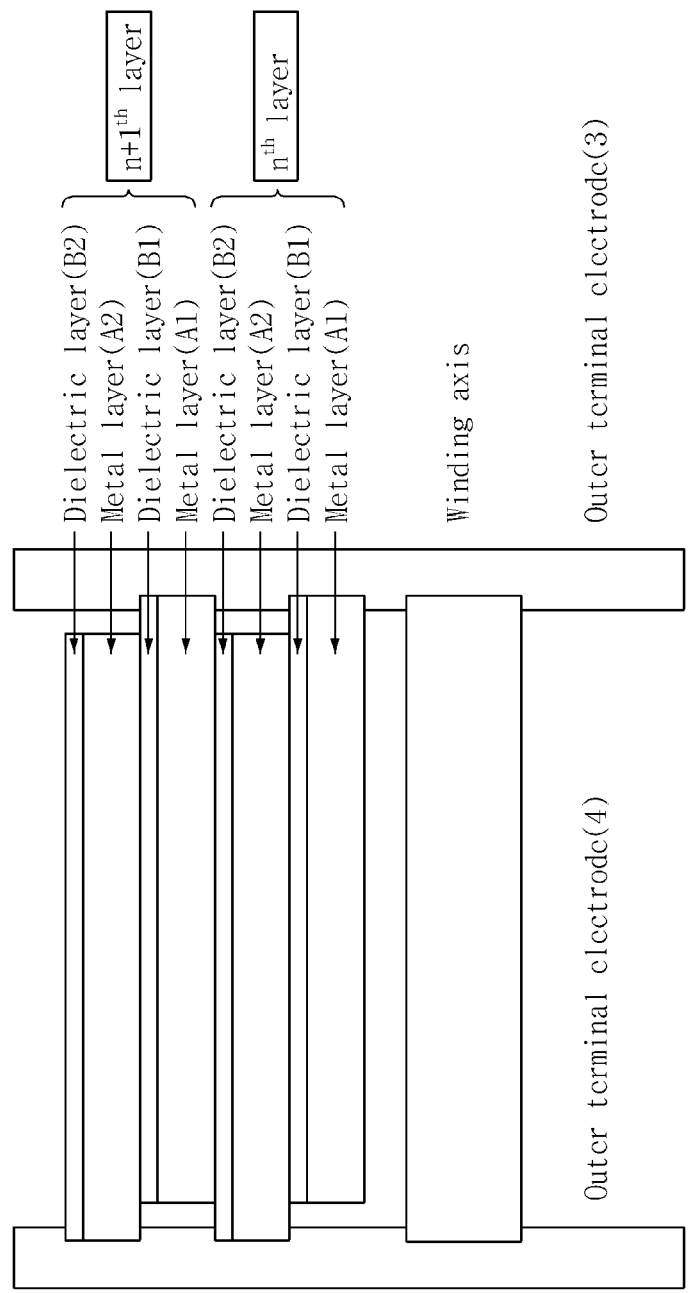
FIG. 3 is a schematic diagram of a winding-type stacked body for a condenser and a condenser using the same according to the present disclosure.

The present disclosure is attained by stacking condenser devices, each including the metal layer and the dielectric layer (condenser device) as a basic unit in a sequential order. According to the preferred embodiment of the present disclosure, it is preferable to stack the end parts of the condenser devices in a staggered manner as shown in FIG. 3.

(Use)

According to the preferred embodiment of the present disclosure, a stacked winding-type condenser using the winding-type stacked body for a condenser may be proposed. The stacked winding-type condenser includes the winding-type stacked body for a condenser which comprises the metal layer and the dielectric layer, in which the dielectric layer is present on the metal layer (primarily acting as an electrode), and a pair of two metal layers each having the dielectric layer are stacked and wound, and a plastic film is absent.

(Outer Electrode)

The present disclosure may have outer electrodes on both side end surfaces of the stacked winding-type condenser. Preferably, the outer electrode is formed by metal spraying.

(Sealing)

The present disclosure may propose sealing using resin after attaching leads to the outer electrodes.

Mode for Disclosure

Although the description of the present disclosure is hereinafter provided through embodiments, the scope of the present disclosure shall not be construed as limiting to the embodiments. Also, the present disclosure relates to a winding-type stacked body for a condenser and a stacked winding-type condenser using the same as described above, and the preferred embodiment has outer electrodes on both side end surfaces of the stacked winding-type condenser, attaches leads, and seals using resin, and in the embodiments described hereinafter, a simple characteristics evaluation as a condenser was conducted, and comparative evaluation was conducted using a simple cell with a simplified device structure. Simplifying this device structure is just for the purpose of simplifying characteristics evaluation, and does not impose any limitation in practicing the present disclosure.

EXAMPLE 1

1. Formation of a Dielectric Layer on a Metal Layer

As a metal layer, (a1): an aluminum foil available from Sumikei Aluminum Foil; 1N30 (foil thickness 6.5 μm) was used, and a dielectric layer was formed on (a1) using a DC magnetron sputtering system. Specifically, the following process was performed.

In a Ulvac magnetron sputtering system SX-200, an aluminum oxide ($Al_2O_3$) target with purity of 4N was installed at a cathode, and the pressure was reduced to the reachable degree of vacuum of $8 \times 10^{-4}$ Pa. Subsequently, argon gas was introduced, and (b1): an $Al_2O_3$ layer having a film thickness of 180 nm was formed by controlling the sputtering time with power of 1000 W and a film forming rate of 6.0 nm/min while rotating a stage on which the (a1) substrate is placed at 10 rpm. In this instance, the distance between the target and the sample was 120 mm, the rotation speed of the stage was 10 rpm, the flow rate of Ar gas was 165 sccm, and the pressure within the chamber after gas introduction was 0.67 Pa.

2. Fabrication of a Simple Condenser Cell (1)

The metal layer (aluminum foil) having the added dielectric layer ($Al_2O_3$), obtained by forming the dielectric layer on the metal layer, was cut into two pieces 70 mm×40 mm in size, they were overlapped such that the dielectric layer side of one test piece is placed in contact with the metal foil side of the other test piece, with the overlapping part of 50 mm×40 mm in size, staggered each other by 20 mm in the lengthwise direction, and two glass plates having the same size as the overlapping part were inserted from the outward side and secured with clips to bring the overlapping part into close contact. Furthermore, an end part protruding outwards of each test piece was used as each lead electrode and connected to an impedance measuring device.

EXAMPLE 2

As a metal layer, (a2): an aluminum foil available from Sumikei Aluminum Foil; 8021 (BESPA, foil thickness 6.5 μm) was used, in a Ulvac magnetron sputtering system SX-200, a silicon oxide ($SiO_2$) target with purity of 4N was installed at a cathode, and as a dielectric film, (b2): a $SiO_2$ layer having a film thickness of 150 nm was formed by controlling the sputtering time with power of 1000 W and a film forming rate of 15.0 nm/min, and a simple condenser cell was fabricated in the same way as Example 1 except the above.

EXAMPLE 3

As a metal layer, (a3): an ultra thin copper foil having an added carrier available from Mitsui Mining & Smelting; Micro Thin MT18Ex (foil thickness 2 μm, carrier thickness 180 μm) was used, and as a dielectric layer, (b3): an $Al_2O_3$ layer having a film thickness of 60 nm was formed by controlling the sputtering time in Example 1, and after film formation, the carrier was peeled off to fabricate a cell, and a simple condenser cell was fabricated in the same way as Example 1 except the above.

COMPARATIVE EXAMPLE 1

An aluminum film having a film thickness of 30 nm was formed on a stretched polypropylene (PP) film having a film thickness of 3 μm by a vacuum deposition method. Using this, a simple condenser cell was fabricated in the same way as Example 1.

(Evaluation Test)

The following evaluation was conducted using, as samples, the simple condenser cells fabricated in the above examples and comparative example. The results are as described in the following table 1.

1. Condenser Characteristics Evaluation

Characteristics evaluation of the simple condenser cell samples was conducted using an impedance measuring device.

The impedance measuring device was used to connect SOLARTRON 1255B FREQUENCY RESPONSE ANALYSER available from Toyo Corporation to SOLARTRON SI1287 ELECTROCHEMICAL INTERFACE available from the same company, and ZPlot was used as interpretation software. The evaluation measured an electrostatic capacitance and a dielectric loss tangent (tan σ) at the frequency of 1 MHz at room temperature (25° C.), and calculated a specific permittivity.

2. High Temperature Voltage Withstand Test

A high temperature voltage withstand test of the simple condenser cell samples was conducted in the following order.

First, the device was pre-heated at the test temperature (110° C.) for 1 hour, and before the test, an initial capacitance was set to be the same as the above Item 1, and evaluation was conducted using the impedance measuring device. Subsequently, DC 1.3 kV voltage was applied to the simple condenser cell for 1 minute in a high temperature tank of 115° C. using a high voltage power source. The capacitance of the simple condenser cell after terminating the application of voltage was measured by the impedance measuring device, and a capacity change ratio before and after the application of voltage was calculated. Subsequently, the device was put in the high temperature tank again, application of voltage in the second cycle was carried out, a second cycle capacity change (accumulation) was calculated, and this process was repeated four times. A fourth cycle capacity change ratio was used in the evaluation. The fourth cycle capacitance change ratio is preferably less than or equal to −20% in practical aspects.

(Evaluation Results)

Hereinabove, the results shown in Table 1 were obtained.

As compared to the conventional film condenser using a polypropylene film as a dielectric (comparative example 1), the results that the electrostatic capacitance and high temperature voltage withstand characteristics were greatly enhanced in all the embodiments were obtained.

Furthermore, in the respect that a value of dielectric loss tangent (tan σ) is quite as low as 0.05% or less, it can be seen that a problem with malfunction in a high frequency circuit caused by an energy loss or heat generation involved therein occurs on level as low as the conventional film condenser using a polypropylene film as a dielectric.

TABLE 1

| Example | Metal layer | Dielectric layer | Film-forming condition | Film thickness of dielectric layer | Capacitance (F) | Specific permittivity (@1 MHz) | Dielectric loss tangent tan σ (% @1 MHz) | Change in high temperature voltage withstand capacitance (%) |
|---|---|---|---|---|---|---|---|---|
| Example 1 | (a1) | (b1) | 1000 W * 30 min | 180 nm | $1.3 * 10^{-6}$ | 8.9 | 0.03 | −2.0 |
| Example 2 | (a2) | (b2) | 1000 W * 10 min | 150 nm | $4.5 * 10^{-7}$ | 3.9 | 0.03 | −1.2 |
| Example 3 | (a3) | (b3) | 1000 W * 10 min | 60 nm | $3.7 * 10^{-6}$ | 8.7 | 0.03 | −2.8 |
| Comparative example 1 | Deposited aluminum | PP film | — | 3.0 μm | $1.3 * 10^{-8}$ | 2.3 | 0.02 | −6.2 |

The description of Table 1 is as follows:

(Metal Layer)

(a1); Aluminum foil available from Sumikei Aluminum Foil; 1N30 (foil thickness 6.5 μm)

(a2); Aluminum foil available from Sumikei Aluminum Foil; 8021 (BESPA, foil thickness 6.5 μm)

(a3); Ultra thin copper foil having an added carrier available from Mitsui Mining & Smelting; Micro Thin MT18Ex (foil thickness 2 μm, carrier thickness 18 μm)

(Dielectric Layer)

(b1); $Al_2O_3$ layer (film thickness 180 nm)

(b2); $SiO_2$ layer (film thickness 150 nm)

(b3); $Al_2O_3$ layer (film thickness 120 nm)

What is claimed is:

1. A winding-type stacked body for a condenser, comprising:
    a metal layer and a dielectric layer,
    wherein the dielectric layer is present on the metal layer,
    wherein a pair of metal layers, each having the dielectric layer thereon, are stacked and wound,
    wherein the dielectric layer does not comprise a plastic film,
    wherein a material of the dielectric layer consists of one or more selected from the group consisting of aluminum oxide, silicon oxide, aluminum nitride, silicon carbonate, barium titanate, forsterite, barium magnesium niobate and barium neodymium titanate,
    wherein a layer thickness of the dielectric layer is higher than or equal to 5 nm and lower than or equal to 3 μm, and
    wherein the layer thickness of the metal layer is higher than or equal to 0.5 μm and lower than or equal to 13 μm.

2. The winding-type stacked body for a condenser according to claim 1, wherein the dielectric layer is formed on the metal layer by a vapor deposition.

3. The winding-type stacked body for a condenser according to claim 2, wherein the dielectric layer is formed on the metal layer by at least one method selected from an electron beam (EB) deposition method, an ion plating method, a sputtering method, a thermal CVD method, a plasma CVD method, an atomic layer deposition (ALD) method and an aerosol deposition (AD) method.

4. The winding-type stacked body for a condenser according to claim 1, wherein a plurality of condenser devices is stacked with end parts of the condenser devices arranged in a staggered manner, each condenser device comprising the metal layer and the dielectric layer.

5. The winding-type stacked body for a condenser according to claim 1, wherein it is manufactured by forming at least two prepared films on a release film and winding a pair of the two prepared films while peeling off the release film, each film prepared by stacking a metal layer and a dielectric layer.

6. A stacked winding-type condenser comprising the winding-type stacked body for a condenser defined in claim 1.

7. A stacked winding-type condenser comprising an outer electrode on both side end surfaces of the winding-type stacked body for a condenser defined in claim 1.

8. The stacked winding-type condenser according to claim 7, wherein the formation of the outer electrode is carried out by metal spraying.

9. The winding-type stacked body for a condenser according to claim 1, wherein a layer thickness of the dielectric layer is higher than or equal to 5 nm and lower than or equal to 500 nm.

10. The winding-type stacked body for a condenser according to claim 1, wherein the layer thickness of the metal layer is higher than or equal to 1.5 μm and lower than or equal to 8 μm.

* * * * *